(12) United States Patent
Huo et al.

(10) Patent No.: US 11,545,703 B2
(45) Date of Patent: Jan. 3, 2023

(54) CHARGING METHOD AND TERMINAL BASED ON USER USAGE HABIT MODEL

(71) Applicant: HUAWEI TECHNOLOGIES CO., LTD., Guangdong (CN)

(72) Inventors: Dawei Huo, Shenzhen (CN); Jie Ding, Shenzhen (CN); Pinghua Wang, Shenzhen (CN); Hui Li, Shenzhen (CN); Jinbo Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 689 days.

(21) Appl. No.: 16/205,418

(22) Filed: Nov. 30, 2018

(65) Prior Publication Data

US 2019/0109483 A1 Apr. 11, 2019

Related U.S. Application Data

(63) Continuation of application No. PCT/CN2016/084334, filed on Jun. 1, 2016.

(51) Int. Cl.
*H02J 7/00* (2006.01)
*H01M 10/44* (2006.01)
*G06N 20/00* (2019.01)

(52) U.S. Cl.
CPC .......... *H01M 10/44* (2013.01); *G06N 20/00* (2019.01); *H02J 7/0071* (2020.01)

(58) Field of Classification Search
CPC ....................................................... H02J 7/042
USPC ......................................................... 320/137
See application file for complete search history.

(56) References Cited

U.S. PATENT DOCUMENTS

| | | | |
|---|---|---|---|
| 2005/0134225 A1 | 6/2005 | Mese et al. | |
| 2011/0018679 A1 | 1/2011 | Davis et al. | |
| 2012/0101755 A1 | 4/2012 | Hirasawa | |
| 2012/0126744 A1* | 5/2012 | Kuroda | H02J 7/04 320/107 |
| 2012/0324578 A1 | 12/2012 | Seinfeld et al. | |

(Continued)

FOREIGN PATENT DOCUMENTS

CN 102498634 A 6/2012
CN 102549875 A 7/2012
(Continued)

OTHER PUBLICATIONS

Extended European Search Report issued in European Application No. 16903492.3 dated Sep. 7, 2019, 15 pages.
(Continued)

*Primary Examiner* — Yalkew Fantu
(74) *Attorney, Agent, or Firm* — Fish & Richardson P.C.

(57) ABSTRACT

The present disclosure provides a charging method and a terminal. The method includes: automatically learning, by the terminal, historical data by using a machine learning algorithm, to establish a habit model of a user, and matching a current time with the usage habit model of the user to determine a current charging intention of the user, so as to determine a charging mode according to the charging intention. By means of the technical solutions, a charging requirement of a user can be effectively identified, and on-demand charging can be implemented. This improves user experience while avoiding a battery life decrease caused by frequent fast charging.

21 Claims, 5 Drawing Sheets

(56) References Cited

U.S. PATENT DOCUMENTS

| | | |
|---|---|---|
| 2013/0314054 A1 | 11/2013 | Bergqvist et al. |
| 2015/0123595 A1* | 5/2015 | Hussain .................... H02J 7/04 320/107 |
| 2015/0188324 A1 | 7/2015 | Nicholson et al. |
| 2015/0262066 A1 | 9/2015 | Li et al. |
| 2019/0036354 A1* | 1/2019 | Liu ...................... H02J 7/00712 |
| 2019/0089170 A1* | 3/2019 | Liu ...................... H02J 7/0077 |

FOREIGN PATENT DOCUMENTS

| | | | |
|---|---|---|---|
| CN | 102801199 | A | 11/2012 |
| CN | 103023075 | A | 4/2013 |
| CN | 103222147 | A | 7/2013 |
| CN | 103311974 | A | 9/2013 |
| CN | 103972967 | A | 8/2014 |
| CN | 104022544 | A | 9/2014 |
| CN | 104933049 | A | 9/2015 |
| CN | 105024422 | A | 11/2015 |
| CN | 105095504 | A | 11/2015 |
| CN | 107231012 | * | 3/2017 |
| EP | 2466719 | A1 | 6/2012 |
| EP | 2595269 | A1 | 5/2013 |
| EP | 2843793 | A2 | 3/2015 |
| TW | 201539932 | A | 10/2015 |
| WO | 2015063340 | A1 | 5/2015 |
| WO | 2016077089 | A1 | 5/2016 |

OTHER PUBLICATIONS

Communication Pursuant to Rule 164(1) EPC issued in European Application No. 16903492.3 dated Mar. 26, 2019, 14 pages.

International Search Report and Written Opinion issued in International Application No. PCT/US2016/084334 dated Mar. 3, 2017, 21 pages.

Office Action issued in Chinese Application No. 201680086263.6 dated Apr. 1, 2020, 12 pages (With English Translation).

* cited by examiner

CHARGING METHOD AND TERMINAL BASED ON USER USAGE HABIT MODEL

CROSS-REFERENCE TO RELATED APPLICATIONS

This application is a continuation of International Application No. PCT/CN2016/084334, filed on Jun. 1, 2016, the disclosure of which is hereby incorporated by reference in its entirety.

TECHNICAL FIELD

The present disclosure relates to charging technologies, and in particular, to a charging method and a terminal.

BACKGROUND

With development of technologies, terminals become increasingly powerful in functions. Users may work and entertain themselves by using terminals, so that the terminals have become indispensable in people's daily life. However, a battery life of a terminal is limited, and the user needs to charge the terminal continually.

Currently, fast charging is a trend and may facilitate terminal use by a user. However, frequent fast charging of the terminal shortens a battery life.

There are many application program sources, and a controller cannot learn whether the application program sources are reliable. This may easily cause a non-secure application program to attack the controller, resulting in malicious damages to a network, and further threaten network security.

SUMMARY

Embodiments of the present disclosure provide a charging method and a terminal, so as to complete terminal charging, facilitate terminal use by a user, and reduce battery losses.

A first aspect of the present disclosure discloses a charging method, where the method includes: obtaining a current time and a usage habit model of a user when it is detected that a connection is established between a terminal and a charger; matching the current time with the usage habit model of the user to obtain a charging intention of the user; determining a charging mode corresponding to the charging intention; and charging the terminal according to the determined charging mode.

With reference to the first aspect, it should be noted that before the obtaining a usage habit model of a user, the method further includes: obtaining historical data that the user uses the terminal within a preset time period; and training, by using a preset machine learning algorithm, the historical data that the user uses the terminal. The training, by using a preset machine learning algorithm, the historical data that the user uses the terminal includes: analyzing the historical data by using the preset machine learning algorithm to obtain an analysis result; and correcting the analysis result, and using the corrected analysis result as the usage habit model of the user. The historical data includes but is not limited to a time period for which the user uses the terminal, a location at which the user uses the terminal, an activity type of the user corresponding to the time and the location, an environmental status corresponding to the time period and the location, a time period of peak power consumption, and an application program used at a frequency greater than a third preset threshold.

With reference to the first aspect, to more accurately obtain the charging intention of the user, optionally, the method further includes: obtaining a location of the terminal; and determining the charging intention of the user according to the current time, the location of the terminal, and the usage habit model of the user. It can be understood that the current time and the location of the terminal are input as parameters to the usage habit model of the user to determine the charging intention of the user. Further, on a basis of obtaining the current time and the location of the terminal, the method may further include: obtaining information about an environment in which the terminal is located; and determining the charging intention of the user according to the current time, the location of the terminal, the information about the environment in which the terminal is located, and the usage habit model of the user. The current time, the location of the terminal, and the information about the environment in which the terminal is located are input as parameters to the usage habit model of the user to determine the charging intention of the user.

With reference to the first aspect, to ensure that the charging mode meets a requirement of the user, the user may be prompted to confirm the charging mode. Optionally, after the determining the charging mode according to the charging intention, the method further includes: sending a charging mode confirmation request to the user, where the charging mode confirmation request is used to ask the user whether charging is performed according to the charging mode; and charging the terminal according to the charging mode when an instruction that the user confirms that charging is performed according to the charging mode is received. Further, the method further includes: changing the model according to information corrected by the user. Optionally, the method further includes: when a charging mode change instruction entered by the user is received, prompting the user to select a new charging mode; and receiving the user-selected charging mode, performing charging according to the user-selected charging mode, and correcting the usage habit pattern of the user according to the user-selected charging mode.

With reference to the first aspect, it should be noted that if obtaining the usage habit model of the user fails, the charging mode needs to be determined according to a condition such as a current time period, a current electricity quantity of the terminal, a current location of the terminal, or an application program running status of the terminal. Optionally, the method further includes: when obtaining the usage habit model of the user fails, determining whether the current time is in a preset sleep time period; calculating a length of time available for charging according to the current time and the preset sleep time period when the current time is in a preset sleep time period; and determining the charging mode according to the length of time available for charging. Optionally, the method further includes: when obtaining the usage habit model of the user fails, obtaining a remaining electricity quantity and a current location of the terminal; and when the remaining electricity quantity is less than a first preset threshold and the current location does not belong to a preset location set, determining that the charging mode is a fast charging mode. Optionally, the method further includes: when obtaining the usage habit model of the user fails, obtaining a remaining electricity quantity and detecting whether there is a running application program in the terminal; and when the remaining electricity quantity is less than a second preset threshold and there is a running application program in the terminal, determining that the charging mode is a fast charging mode.

With reference to the first aspect, it should be noted that the historical data may be stored in a database, or may be stored in a storage medium, or may also be stored in a cloud. The terminal may be currently located by using a GPS system (Global Positioning System), obtain an ambient temperature by using a temperature sensor, obtain an ambient humidity by using a humidity sensor, obtain a current altitude by using an altitude sensor, obtain a current light intensity by using a light sensor, determine duration for which the user uses the terminal, an application program use frequency, or the like according to an operation trace, and then store obtained information in a log.

A second aspect of the present disclosure discloses a terminal, where the terminal includes: an obtaining unit, configured to obtain a current time and a usage habit model of a user when it is detected that a connection is established between the terminal and a charger; a matching unit, configured to match the current time with the usage habit model of the user to obtain a charging intention of the user; a determining unit, configured to determine a charging mode corresponding to the charging intention; and a charging unit, configured to charge the terminal according to the determined charging mode.

With reference to the second aspect, the terminal further includes a training unit, where the obtaining unit is further configured to obtain historical data that the user uses the terminal within a preset time period; the training unit is configured to train, by using at least one preset machine learning algorithm, the historical data that the user uses the terminal, to obtain the usage habit model of the user; and the training unit is configured to analyze the historical data by using the preset machine learning algorithm, and further configured to: correct the analysis result and set the corrected analysis result to the usage habit model of the user. The historical data includes but is not limited to a time period for which the user uses the terminal, a location at which the user uses the terminal, an activity type of the user corresponding to the time and the location, an environmental status corresponding to the time period and the location, a time period of peak power consumption, and an application program used at a frequency greater than a third preset threshold.

With reference to the second aspect, to more accurately obtain the charging intention of the user, optionally, the obtaining unit is further configured to obtain a location of the terminal; and the matching unit is configured to determine the charging intention of the user according to the current time, the location of the terminal, and the usage habit model of the user.

With reference to the second aspect, to more accurately obtain a charging intention of the user, the obtaining unit is further configured to obtain information about an environment in which the terminal is located; and the matching unit is configured to determine the charging intention of the user according to the current time, the location of the terminal, the information about the environment in which the terminal is located, and the usage habit model of the user.

With reference to the second aspect, to ensure that the determined charging intention meets a requirement of the user, optionally, the terminal further includes a prompting unit, where the prompting unit is configured to send a charging mode confirmation request to the user, and the charging mode confirmation request is used to ask the user whether charging is performed according to the charging mode; and the charging unit is configured to charge the terminal according to the charging mode when an instruction that the user confirms that charging is performed according to the charging mode is received.

Further, to ensure accuracy of the usage habit model of the user, the usage habit model of the user may be corrected by using data modified by the user. Optionally, the terminal further includes a receiving unit and a correction unit, where the prompting unit is further configured to: when a charging mode change instruction entered by the user is received, prompt the user to select a new charging mode; the receiving unit is configured to receive the user-selected charging mode; the charging unit is configured to perform charging according to the user-selected charging mode; and the correction unit is configured to correct the usage habit pattern of the user according to the user-selected charging mode.

With reference to the second aspect, it should be noted that, when obtaining the usage habit model of the user fails, the obtaining unit may further determine the charging mode according to a time period, an electricity quantity of the terminal, an application program running status of the terminal, and a location of the terminal.

Optionally, the terminal further includes a judging unit and a calculation unit, where the judging unit is configured to: when obtaining the usage habit model of the user fails, determine whether the current time is in a preset sleep time period; the calculation unit is configured to calculate a length of time available for charging according to the current time and the preset sleep time period when the current time is in the preset sleep time period; and the determining unit is further configured to determine the charging mode according to the length of time available for charging.

Optionally, the obtaining unit is further configured to obtain a remaining electricity quantity and a current location of the terminal when obtaining the usage habit model of the user fails; and the determining unit is configured to: when the remaining electricity quantity is less than a first preset threshold and the current location does not belong to a preset location set, determine that the charging mode is a fast charging mode.

Optionally, the terminal further includes a detection unit, where the obtaining unit is configured to obtain a remaining electricity quantity of the terminal when obtaining the usage habit model of the user fails; the detection unit is configured to: when obtaining the usage habit model of the user fails, detect whether there is a running application program in the terminal; and the determining unit is configured to: when the remaining electricity quantity is less than a second preset threshold and there is a running application program, determine that the charging mode is a fast charging mode.

A third aspect of the present disclosure discloses a terminal, where the terminal includes a CPU (Central Processing Unit, central processing unit), a memory, a display, and a bus. The CPU is configured to run code stored in the memory to perform the method in the first aspect.

A fourth aspect of the present disclosure discloses a storage medium, where the storage medium stores code used for performing the method in the first aspect.

It can be learned from the foregoing that, the technical solutions of the present disclosure provide a charging method and a terminal. According to the charging method provided in the present disclosure, historical data can be automatically learned by using a machine learning algorithm to establish a user habit model, and a current charging intention of a user may be determined according to a current time and the usage habit model of the user, so as to determine a charging mode according to the charging intention. By means of the technical solutions, a charging requirement of a user can be effectively identified, and on-demand charging can be implemented. This improves user experience while avoiding a battery life decrease caused by frequent fast charging.

BRIEF DESCRIPTION OF DRAWINGS

To describe the technical solutions in the embodiments of the present disclosure more clearly, the following briefly describes the accompanying drawings required for describing the embodiments of the present disclosure.

DESCRIPTION OF EMBODIMENTS

The following clearly describes the technical solutions in the embodiments of the present disclosure with reference to the accompanying drawings in the embodiments of the present disclosure.

Though terminals develop rapidly and hardware technologies are upgraded quickly, terminal battery technologies do not make much progress in recent years, and a battery electricity quantity restricts use of terminals (for example, a smartphone). Emergence of fast charging technologies provides a new approach to resolve a terminal charging problem.

Although the fast charging technologies can effectively resolve a problem about along charging time, excessively frequent fast charging causes irreversible damages to a battery, and reduces a battery life. In principle, battery damages are basically caused by two aspects. On one hand, when a battery is charged, the cathode and anode of the battery shrink with release of ions; and when a battery discharges, the cathode and anode of the battery expand with absorption of the ions. Frequent fast charging may damage chemical substances in the battery, shortening the battery life. On the other hand, during fast charging, a current is relatively high, and a thermal effect of the current is intensified. Therefore, the battery is at a high temperature, and the high temperature may cause a sharp drop in a capacity and permanent damages to a battery.

In a normal charging state (generally, charging with a power less than 10 W, such as 5V1 A or 5V1.5 A, is deemed as normal charging), a charging current is relatively low, and damages to the battery are slight. However, in a fast charging state, a charging current is several times of a normal charging current, and an excessively high current during the charging intensifies a chemical reaction in the battery, and doubles damages to a battery electrode material and to an electrode structure, shortening a battery service life.

The present disclosure provides a charging method and a terminal. The terminal can automatically learn historical data by using a machine learning algorithm, to establish a habit model of a user, and may determine a current charging intention of the user according to a current time and the usage habit model of the user, so as to determine a charging mode according to the charging intention. By means of the technical solutions, a charging requirement of a user can be effectively identified, and on-demand charging can be implemented. This improves user experience while avoiding a battery life decrease caused by frequent fast charging.

Figure 1:
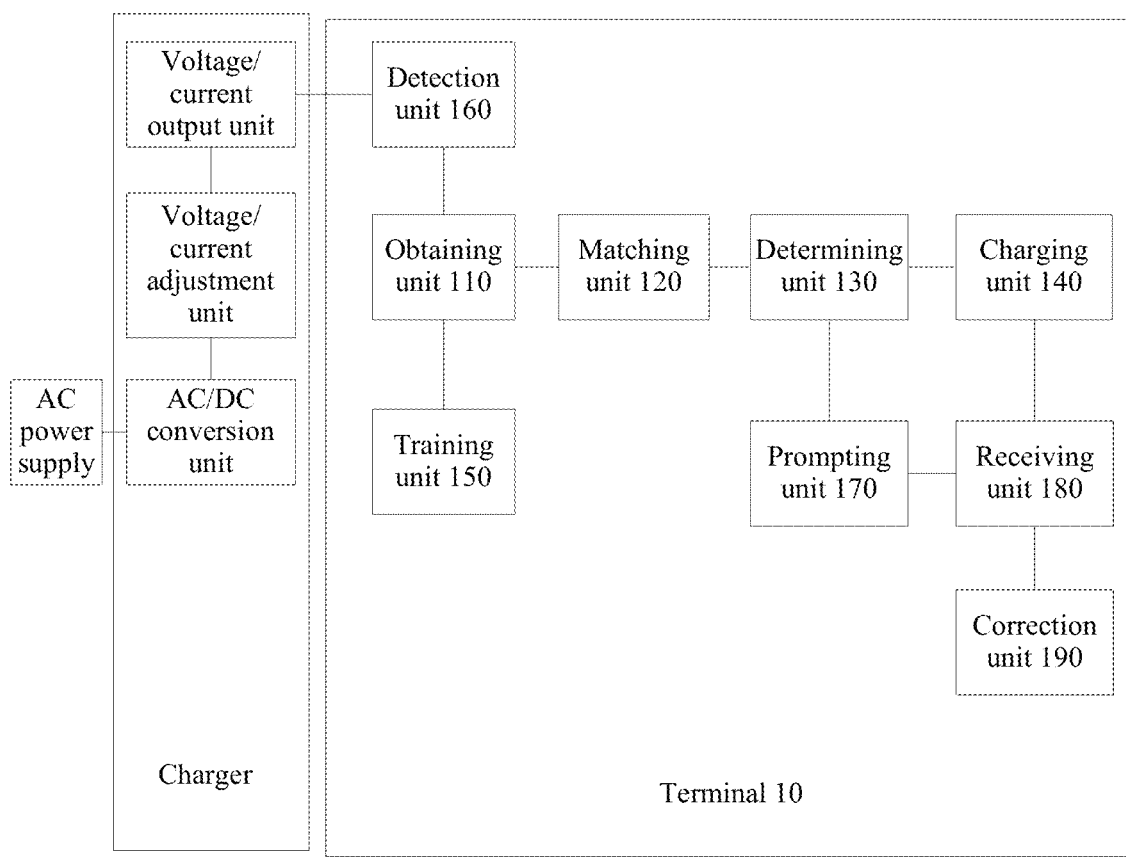
FIG. 1 is a schematic structural diagram of a terminal according to an embodiment of the present disclosure.

As shown in FIG. 1, FIG. 1 is a terminal 10. The terminal 10 includes an obtaining unit 110, a matching unit 120, a determining unit 130, a charging unit 140, and a training unit 150.

The terminal 10 may be an electronic device such as a mobile phone, a tablet computer, or an intelligent wearable device.

It can be understood that, the terminal 10 trains historical data within a preset time period according to a machine learning algorithm to obtain a usage habit model of a user. It can be understood that more historical data is beneficial to training for the usage habit model of the user.

The historical data in the terminal 10 includes but is not limited to a time period for which the user uses the terminal 10, a location at which the user uses the terminal 10, an activity type of the user corresponding to the time and the location, an environmental status corresponding to the time period and the location, a time period of peak power consumption, and an application program used at a frequency greater than a third preset threshold.

For example, a user X continuously uses a mobile phone at 9:00 to 11:00 every night at home, an activity type of the user corresponding to the time period and the location is entertainment, an environment status corresponding to the time period and the location is quiet with dark light, and a time period of peak power consumption is 9:00 to 11:00.

It should be noted that, for example, an application program that runs longer than 20 minutes per day can be considered as an application program used at a frequency greater than the third preset threshold. That is, more than the third preset threshold is a service time of more than 20 minutes. No limitation is imposed herein on the third preset threshold. The third preset threshold may be a default setting of the terminal, or may be set by a user.

For another example, an application program that runs for more than three times per day can be considered as an application program used at a frequency greater than the third preset threshold. That is, the third preset threshold is three running times.

A common application program used at a frequency greater than the third preset threshold may be a game application program, or may be a social application program, or even may be a news application program.

There are many methods for obtaining the historical data, which can be obtained directly from a storage medium or a database of the terminal, or can be obtained from a cloud data center connected to the terminal.

For example, the terminal 10 stores, by using various types of sensors (such as a temperature sensor, a gyroscope, a camera, an acceleration sensor, and a location sensor), a process of using the terminal 10 by the user in a log.

For example, the log may record in chronological order what application programs the user uses today, and how long each application program is used. In this way, an application program used at a frequency greater than the third preset threshold may be determined based on the log.

For example, the log may record how many times the user charges the terminal each day, how long the terminal is charged each time, and whether the user uses the terminal each time when the terminal is being charged. In this way, a fixed charging time period of the user and a electricity quantity consumption rate of the terminal may be determined according to the log.

For example, the log may also record a location at which the terminal 10 is located today and duration for which the terminal 10 stays at each location. In this way, a main activity place of the user may be determined according to the log. For example, an area where the terminal 10 stays for more than eight hours (the area may be a building, a community, a company, or the like) is considered as a home or an office by default.

For example, the log may also record a time period in which a power consumption rate of the terminal 10 is relatively high.

In conclusion, the terminal 10 may obtain a large amount of data information by using various sensors, for example, obtain an ambient temperature by using a temperature sensor, obtain an ambient humidity by using a humidity sensor, obtain a current altitude by using an altitude sensor, locate a current location by using a GPS system, and obtain a current light intensity by using a light sensor. Then the terminal may store the obtained information in the log.

The machine learning algorithm includes but is not limited to a classification algorithm, a clustering algorithm, a regression algorithm, an enhanced learning algorithm, a migration learning algorithm, and a deep learning algorithm.

The obtaining unit 10 is configured to obtain historical data stored by the terminal 10. For example, the historical data may be historical data obtained from the log.

The training unit 150 is configured to train, according to at least one machine learning algorithm, the historical data obtained by the obtaining unit 10 to obtain the usage habit model of the user.

The training unit 150 may analyze the historical data by using the at least one machine learning algorithm, correct an analysis result, and set the corrected analysis result to the usage habit model of the user.

In an embodiment of the present disclosure, the terminal further includes a detection unit 160.

The detection unit 160 is configured to detect whether a connection is established between the terminal 10 and a charger.

When the detection unit 160 detects that a connection is established between the terminal 10 and the charger, the detection unit 160 sends an instruction to the obtaining unit 110.

The obtaining unit 110 is configured to obtain a current time and the usage habit model of the user according to the instruction. The obtaining unit 110 may obtain the current time by using a clock of the terminal.

The matching unit 120 is configured to: when the obtaining unit 110 successfully obtains the usage habit model of the user, match the current time with the usage habit model of the user to obtain a charging intention of the user.

It should be noted that the charging intention includes but is not limited to 2-hour full charge, 8-hour full charge, fast charging, and any-time full charge.

For example, a user B is an office worker who works for five days and rests for two days at weekend every week, and has regular routines and habits. Based on historical use data of using an intelligent terminal by the user in a time period of one month, usage habits of using the intelligent terminal by the user are obtained as follows:

| Time period | Location of a user | Activity type | Usage habit | Charging intention |
|---|---|---|---|---|
| 0:00 to 8:00 | Home | Sleeping | No use/Power off/Silence | Full charge completed before 8:00 |
| 8:00 to 19:00 for working days | Office, vehicle, or business trip | Working | Use as needed | Fast charging |
| 19:00 to 24:00 for working days | Home | Home entertainment | Frequent use for entertainment and social communication | Fast charging |
| 8:00 to 20:00 for weekends | Outdoors, mall, or self-driving | Outdoor recreation | Extremely low power | Fast charging |
| 20:00 to 21:00 for weekends | Home | Reading news | Normal use | Normal charging |

Optionally, the obtaining unit 110 is further configured to obtain the location of the terminal 10.

It can be understood that the location of the terminal may be located by using a GPS. Common locations include but are not limited to a home, a workplace, a bar, a library, a restaurant, and the like. The terminal 10 may be connected to sensors by using the obtaining unit 110, and may be connected directly to the sensors by using a bus.

When the obtaining unit 110 successfully obtains the usage habit model of the user, the obtaining unit 110 sends a matching instruction to the matching unit 120. The matching unit 120 is configured to match the current time and the location of the terminal 10 with the usage habit model of the user according to the matching instruction sent by the obtaining unit 110, to obtain the charging intention of the user. It can be understood that, the charging intention of the user may be more accurately determined by inputting the current time and the location of the terminal to the usage habit model of the user.

Optionally, the obtaining unit 110 is further configured to obtain information about an environment in which the terminal 10 is located. It can be understood that, the obtaining unit 110 may obtain, by using a temperature sensor, a temperature of the environment in which the terminal 10 is located; may also obtain, by using a humidity sensor, a humidity of the environment in which the terminal 10 is located; may also obtain, by using an altitude sensor, an altitude of the location of the terminal 10; may also obtain, by using a light sensor, a light intensity of the environment in which the terminal 10 is located; may also obtain, by using a microphone, sound information of the environment in which the terminal 10 is located; may also obtain a motion state of the user by using an acceleration sensor; and may also obtain a status of the terminal 10 by using a level instrument. An activity of the user may be determined with reference to the humidity, the temperature, the altitude, the light intensity, and the sound that are of the environment in which the terminal 10 is located, and the motion state of the user.

For example, if the environment is quiet with bright light, and the user is not in a motion state, the user may work in office.

For another example, if the environment is noisy, the humidity is high, and the user is in a rapid motion state, the user may be in a car.

For another example, if the environment is quiet with no light, the user is in a motionless state, and a time period is from 1:00 a.m. to 5:00 a.m., the user may be in a sleeping state.

For another example, if an altitude is high, a humidity is high, a temperature is low, and the user is in a motion state, the user may be climbing a mountain outdoors or the like.

When the obtaining unit 110 successfully obtains the usage habit model of the user, the obtaining unit 110 sends a matching instruction to the matching unit 120.

The matching unit 120 is configured to match, according to the matching instruction sent by the obtaining unit 110, the current time, the location of the terminal 10, and the environment in which the terminal 10 is located with the usage habit model of the user to obtain the charging intention of the user.

It can be understood that, the charging intention of the user may be more accurately determined by inputting the current time, the location of the terminal, and the information about the environment in which the terminal is located to the usage habit model of the user.

The matching unit 120 is further configured to send the charging intention to the determining unit 130.

The determining unit 130 is configured to determine a charging mode according to the charging intention.

A correspondence between the charging intention and the charging mode may be stored in the terminal in advance. Alternatively, a charging solution may be determined according to the charging intention. If there are multiple charging solutions, one charging solution meeting the usage habit of the user is selected from the multiple charging solutions. It should be pointed out that, the charging solution may include one charging mode, or may include multiple charging modes (for example, a combination mode of fast charging and slow charging). There are many fast charging modes, and no limitation is imposed herein on the fast charging mode (such as open-loop fast charging, closed-loop fast charging, or the like).

For example, when the user considers that charging may be completed between 1:00 a.m. and 7:00 a.m., in this period, fast charging may be selected, or the combination mode of fast charging and slow charging may be selected, or even slow charging may be selected. It should be noted that, if time permits, long-time slow charging or short-time fast charging is selected preferably.

For another example, if it is determined that, according to the time period and the usage habit model of the user, the user may be playing a game in the current time period, fast charging is selected preferably.

Optionally, the terminal 10 further includes a prompting unit 170 and a receiving unit 180.

After the charging mode is determined, the prompting unit 170 is configured to prompt the user whether charging is performed according to the charging mode. The prompting unit 170 is configured to send a charging mode confirmation request to the user. The charging mode confirmation request is used to ask the user whether charging is performed according to the charging mode.

Figure 2:
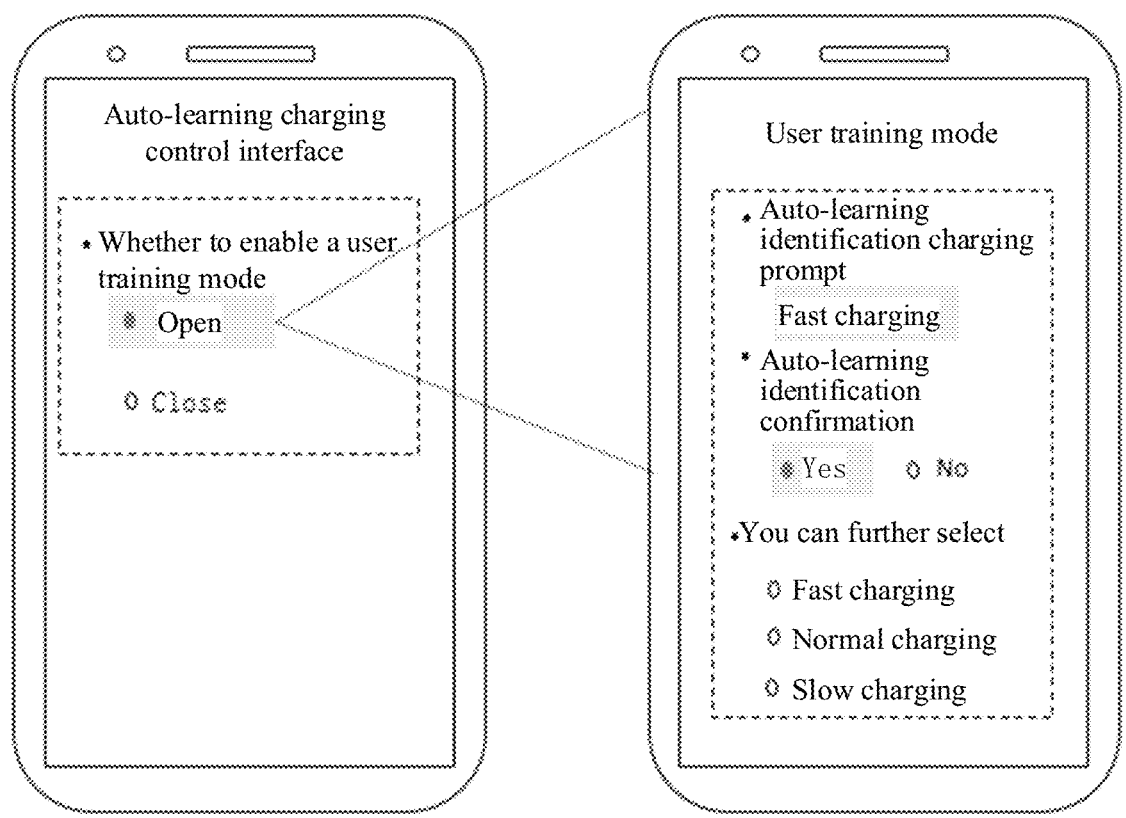
FIG. 2 is a user prompting interface according to an embodiment of the present disclosure.

When the receiving unit 180 receives an instruction that the user confirms that charging is performed according to the charging mode, the charging unit 140 charges the terminal according to the charging mode. It should be noted that the prompting unit 170 has many prompting manners, including but not limited to word prompting and voice prompting manners. As shown in FIG. 2, FIG. 2 shows a specific prompting manner. FIG. 2 shows a prompting interface. On the interface, a charging mode, whether the terminal is in a machine learning state (an auto-learning state), and optional charging modes are displayed.

Optionally, the prompting unit 170 is further configured to: when a charging mode change instruction entered by the user is received, prompt the user to select a new charging mode.

The receiving unit 180 is further configured to receive the user-selected charging mode; and the charging unit 140 is configured to perform charging according to the user-selected charging mode.

Further, the terminal 10 further includes a correction unit 190. The correction unit 190 is configured to correct the usage habit model of the user according to the user-selected charging mode.

For example, the correction unit 190 determines a time period to which the current time belongs; determines a corresponding charging mode in the usage habit model of the user that is in the time period; and changes the corresponding charging mode in the usage habit model of the user that is in the time period to the user-selected charging mode. The current time is 3:00 a.m., belonging to a time period from 1:00 a.m. to 6:00 a.m., and correspondingly, a charging mode in the usage habit model of the user is slow charging. When the user changes the charging mode to fast charging, the correction unit 190 changes the charging mode that corresponds to the time period from 1:00 a.m. to 6:00 a.m. in the usage habit model of the user to fast charging.

It can be understood that, after the charging mode is determined according to the charging intention, the user is prompted to determine whether the charging mode meets a requirement of the user, and the usage habit model of the user is corrected according to feedback information of the user. It should be noted that, the user may set whether a prompting option is shown. If the user considers that, after several previous corrections, a subsequent charging intention or a charging mode corresponding to a charging intention can meet the requirement of the user, it may be considered that the usage habit model of the user is an accurate model, and the user may set an option "Confirmation of a charging mode is not prompted" on a setting page.

When the determining unit 130 determines the charging mode, the charging unit 140 performs charging according to the charging mode.

A battery in the terminal 10 includes but is not limited to, a lithium battery, a lithium-ion battery, an air battery, a lead-acid battery, and a super capacitor.

The charging unit 140 is further configured to obtain a battery status parameter such as a battery voltage, a current, an internal resistance, a battery capacity, a battery temperature, or a battery internal pressure, so as to adjust the charging mode according to the battery status parameter.

For example, when a battery temperature is greater than a temperature threshold (40° C.) or a battery voltage is greater than a voltage threshold (4.0V), a charging mode cannot be or is not recommended to be switched to the fast charging mode. When a battery capacity is less than a capacity threshold (20%) or a battery voltage is less than a voltage threshold (3.3V), the fast charging mode is preferably selected or it is recommended that the charging mode be switched to the fast charging mode.

It can be understood that, thresholds of the battery status parameters are related to a battery type. The thresholds may be set by default before delivery, or may be user-defined. Safety performance of switching a battery charging mode may be further determined by setting the battery status parameter thresholds.

It can be understood that the present disclosure provides a charging method and a terminal. The terminal can automatically learn historical data by using a machine learning algorithm, to establish a habit model of a user, and may determine a current charging intention of the user according to a current time and the usage habit model of the user, so as to determine a charging mode according to the charging intention. By means of the technical solutions, the charging requirement of a user can be effectively identified, and on-demand charging can be implemented. This improves user experience while avoiding a battery life decrease caused by frequent fast charging.

Figure 3:
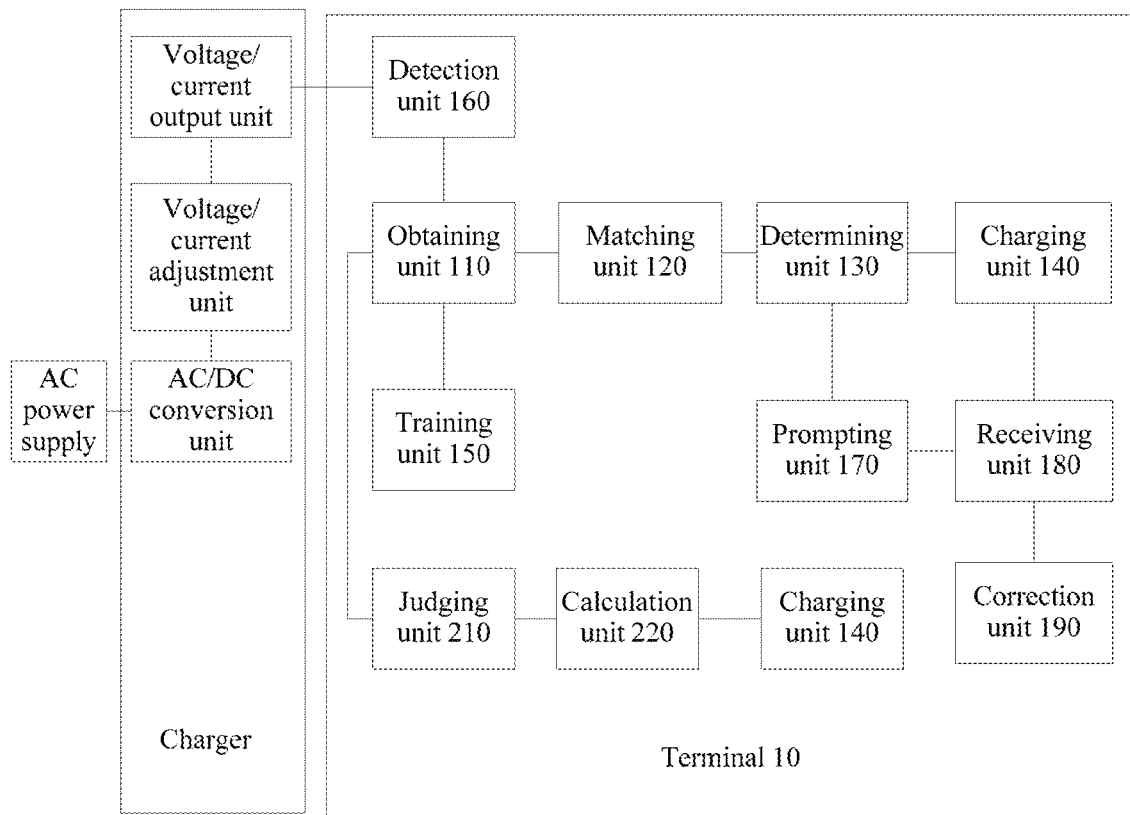
FIG. 3 is a schematic structural diagram of a terminal according to another embodiment of the present disclosure.

As shown in FIG. 3, based on the foregoing embodiment, in another embodiment of the present disclosure, the terminal 10 further includes a judging unit 210 and a calculation unit 220.

The detection unit 160 is configured to detect whether a connection is established between the terminal 10 and a charger.

The obtaining unit 110 is configured to obtain a current time and a usage habit model of a user when the detection unit 210 detects that a connection is established between the terminal 10 and the charger.

The judging unit 210 is configured to: when the obtaining unit 220 fails to obtain the usage habit model of the user, determine whether the current time is in a preset sleep time period.

The calculation unit 220 is configured to calculate a length of time available for charging according to the current time and the preset sleep time period when the current time is in the preset sleep time period.

For example, if the current time is 1:00 a.m., and the preset sleep time period is from 0:00 a.m. to 6:00 a.m., the current time is in the preset sleep time period. Further, it can be calculated that a length of time available for charging is five hours.

The determining unit 130 is further configured to determine a charging mode according to the time length.

For example, if a current electricity quantity of the terminal is 40%, and a preset value of an electricity quantity is 90% (which may be a default value of the terminal, or may be set by the user), that is, a charging requirement of the terminal 10 is to charge 50% within five hours.

With respect to this requirement, there may be multiple charging manners. In slow charging, the terminal can be charged 10% per hour, and in fast charging, the terminal can be charged 40% per hour. Solution 1: Slow charging for five consecutive hours. Solution 2: Fast charging for one hour and slow charging for two hours. Solution 3: Fast charging for one and a half hours. However, from a perspective of meeting a usage requirement of the user to the maximum extent and from a perspective of prolonging a battery service life, the charging mode may be determined as a slow charging mode because the user basically does not use the terminal 10 in the sleep time period.

The charging unit 140 performs charging according to the charging mode.

As shown in FIG. 1, in another embodiment of the present disclosure, if obtaining the habit model of the user fails because the terminal 10 does not yet obtain the usage habit model of the user by means of training or a storage medium is faulty, a current electricity quantity and whether a charging condition is satisfied need to be considered. Details are as follows:

The obtaining unit 110 is further configured to obtain a remaining electricity quantity and a current location of the terminal when obtaining the usage habit model of the user fails.

The determining unit 130 is configured to: when the remaining electricity quantity is less than a first preset threshold and the current location does not belong to a preset location set, determine that the charging mode is a fast charging mode.

It should be noted that, the first preset threshold may be a default value of the terminal, or may be set by the user.

The preset location set may be understood as a place where a long-time charging is allowed, for example, a home or an office.

For example, the first preset threshold is 20%, and the preset location set is home and office. When the terminal 10 is connected to the charger, if it is determined that a location of the terminal 10 is a shop, and an electricity quantity of the terminal 10 is 15%, a charging mode is determined as a fast charging mode.

For another example, when the terminal 10 is connected to the charger, it is determined that a location of the terminal 10 is home, and an electricity quantity of the terminal 10 is 30%, the user is prompted whether fast charging is performed. If time permits, the user may select slow charging; or if the time does not permit, the user may select fast charging.

As shown in FIG. 1, in another embodiment of the present disclosure, if obtaining the habit model of the user fails because the terminal 10 does not yet obtain the usage habit model of the user by means of training or a storage medium is faulty, a current electricity quantity and a current usage status of the terminal 10 need to be considered. Details are as follows:

The obtaining unit 110 is further configured to obtain a remaining electricity quantity of the terminal when obtaining the usage habit model of the user fails.

The detection unit 160 is configured to: when obtaining the usage habit model of the user fails, detect whether there is a running application program in the terminal.

The determining unit 130 is configured to: when the remaining electricity quantity is less than a second preset threshold and there is a running application program, determine that the charging mode is a fast charging mode.

It should be noted that, the second preset threshold may be a default value of the terminal, or may be set by the user.

For example, the second preset threshold is 30%. When the terminal 10 is connected to the charger, and a running application program is detected in the terminal 10, it indicates that the user needs to use the terminal 10, and the terminal should be charged fast to meet the requirement of the user.

As shown in FIG. 1, in another embodiment of the present disclosure, if obtaining the habit model of the user fails because the terminal 10 does not yet obtain the usage habit model of the user by means of training or a storage medium is faulty, a current electricity quantity, a current usage status of the terminal 10, and whether a charging condition is satisfied at the place where the terminal 10 is currently located need be considered. When the current electricity quantity is less than a second preset threshold, the terminal is in the state of running multiple application programs, and a charging condition is satisfied, the terminal 10 is charged according to a fast charging mode.

In another embodiment of the present disclosure, it can be understood that, user habits can be obtained by analyzing a relationship between a common activity of a user, such as entertainment, sport, or sleeping, and use of an intelligent terminal. For example, if a terminal is suddenly out of power when a user is using the terminal for entertainment, it may be determined that a charging intention of the user is fast charging, and an entertainment activity may continue even without full charge. If the user likes to run outdoors and records sport data, and an intelligent terminal is out of power when the user is running, it may be determined that the user needs fast charging. If the user has a regular sleeping habit, for sleeping at night, it may be determined that the user does not need to use the intelligent terminal, and in this case, slow charging is selected preferably. For a lunch break, it may be determined that the user needs to increase the electricity quantity of the intelligent terminal, a charging rate may be determined according to a length of the lunch break of the user.

The terminal provided in this embodiment of the present disclosure can establish a usage habit model of a user by means of auto-learning (by using a machine learning algorithm and historical data), so as to match a current time, a location of the terminal, and an environment in which the terminal is located with the usage habit model of the user to determine a charging intention of the user; and determine a charging mode according to the charging intention. By means of the technical solutions, a fast charging requirement of a user can be effectively identified, and on-demand fast charging can be implemented. This improves user experience while avoiding a battery life decrease caused by unnecessary frequent fast charging.

Figure 4:
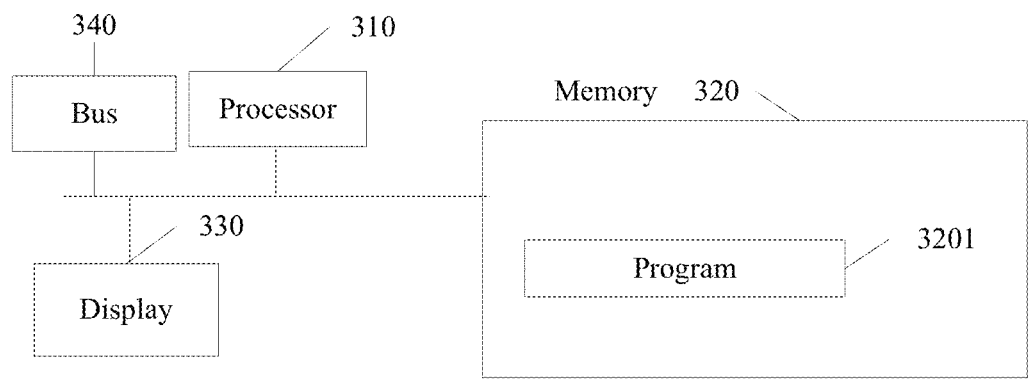
FIG. 4 is a diagram of a physical structure of a terminal according to an embodiment of the present disclosure.

As shown in FIG. 4, in another embodiment of the present disclosure, a terminal 30 is provided. The terminal 30 includes a CPU 310 (Central Processing Unit, central processing unit), a memory 320, a display 330, and a bus 340. The CPU 310 is configured to run code stored in the memory 320 to start a charging program. A charging process includes:

obtaining a current time and a usage habit model of a user when it is detected that a connection is established between the terminal 30 and a charger;

matching the current time with the usage habit model of the user to obtain a charging intention of the user;

determining a charging mode corresponding to the charging intention; and charging the terminal according to the determined charging mode.

It should be noted that, before the obtaining a usage habit model of a user, the executed process further includes:

training, by using a preset machine learning algorithm, historical data that the user uses the terminal, to obtain the usage habit model of the user, where it should be noted that, the machine learning algorithm and the historical data may be stored in the memory 320 in advance.

It should be noted that, before the training, by using a preset machine learning algorithm, historical data that the user uses the terminal, the executed process further includes:

obtaining the historical data that the user uses the terminal within a preset time period, where the historical data includes but is not limited to a time period for which the user uses the terminal, a location at which the user uses the terminal, an activity type of the user corresponding to the time and the location, an environmental status corresponding to the time period and the location, a time period of peak power consumption, and an application program used at a frequency greater than a third preset threshold.

The training, by using a preset machine learning algorithm, historical data that the user uses the terminal includes:

analyzing the historical data by using the preset machine learning algorithm; and correcting an analysis result, and setting the corrected analysis result to the usage habit model of the user.

Figure 5:
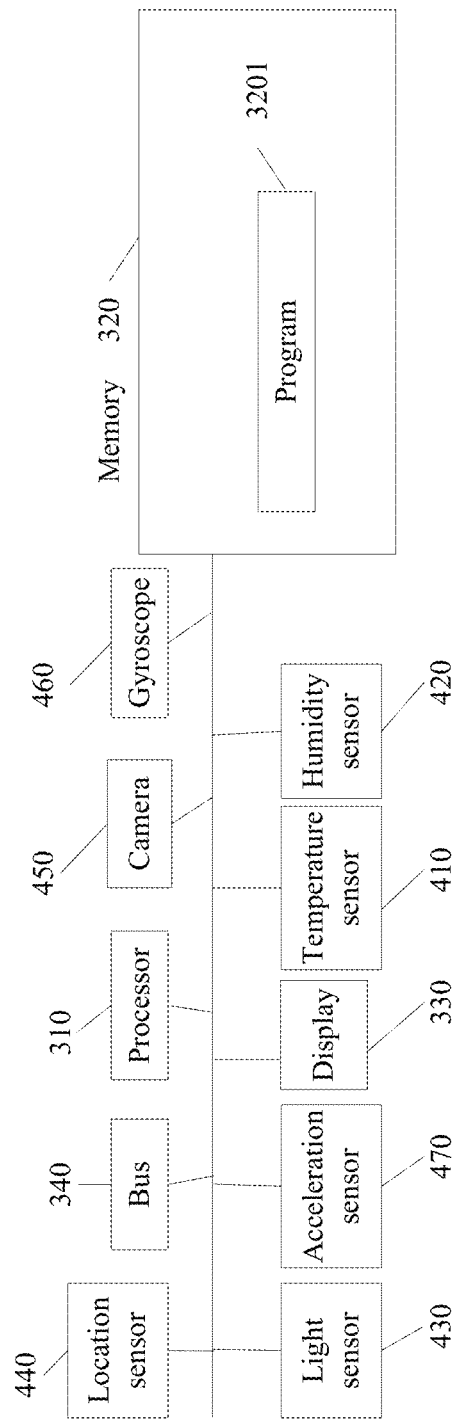
FIG. 5 is a diagram of a physical structure of a terminal according to another embodiment of the present disclosure.

As shown in FIG. 5, the terminal 30 further includes a temperature sensor 410, a humidity sensor 420, a light sensor 430, a location sensor 440, a camera 450, a gyroscope 460, an acceleration sensor 470, or the like. The terminal 30 obtains user data by using the foregoing sensors, and stores the data in the memory 320. The stored data may be considered as the historical data.

Optionally, before the matching the current time with the usage habit model of the user to obtain a charging intention of the user, the executed process further includes:

obtaining a location of the terminal; and the matching the current time with the usage habit model of the user to obtain a charging intention of the user includes:

determining the charging intention of the user according to the current time, the location of the terminal, and the usage habit model of the user.

Optionally, before the matching the current time with the usage habit model of the user to obtain a charging intention of the user, the executed process further includes:

obtaining information about an environment in which the terminal is located; and the matching the current time with the usage habit model of the user to obtain a charging intention of the user includes:

determining the charging intention of the user according to the current time, the location of the terminal, the information about the environment in which the terminal is located, and the usage habit model of the user.

Optionally, after the determining a charging mode of the user according to the charging intention, the executed process further includes:

prompting the user whether charging is performed according to the charging mode; and charging the terminal according to the charging mode when an instruction that the user confirms that charging is performed according to the charging mode is received.

Optionally, the executed process further includes:

when a charging mode change instruction entered by the user is received, prompting the user to select a new charging mode; and receiving the user-selected charging mode, performing charging according to the user-selected charging mode, and correcting the usage habit pattern of the user according to the user-selected charging mode.

Optionally, the executed process further includes:

when obtaining the usage habit model of the user fails, determining whether the current time is in a preset sleep time period;

when the current time is within a preset sleep time period, calculating, according to the current time and the preset sleep time period, a terminal charging time length required to make the electricity quantity of the terminal reach a preset value; and determining the charging mode according to the time length.

Optionally, the executed process further includes:

when obtaining the usage habit model of the user fails, obtaining a remaining electricity quantity and a current location of the terminal; and when the remaining electricity quantity is less than a first preset threshold and the current location does not belong to a preset location set, determining that the charging mode is a fast charging mode.

Optionally, the executed process further includes:

when obtaining the usage habit model of the user fails, obtaining a remaining electricity quantity of the terminal, and detecting whether there is a running application program in the terminal; and when the remaining electricity quantity is less than a second preset threshold and there is a running application program, determining that the charging mode is a fast charging mode.

Figure 6:
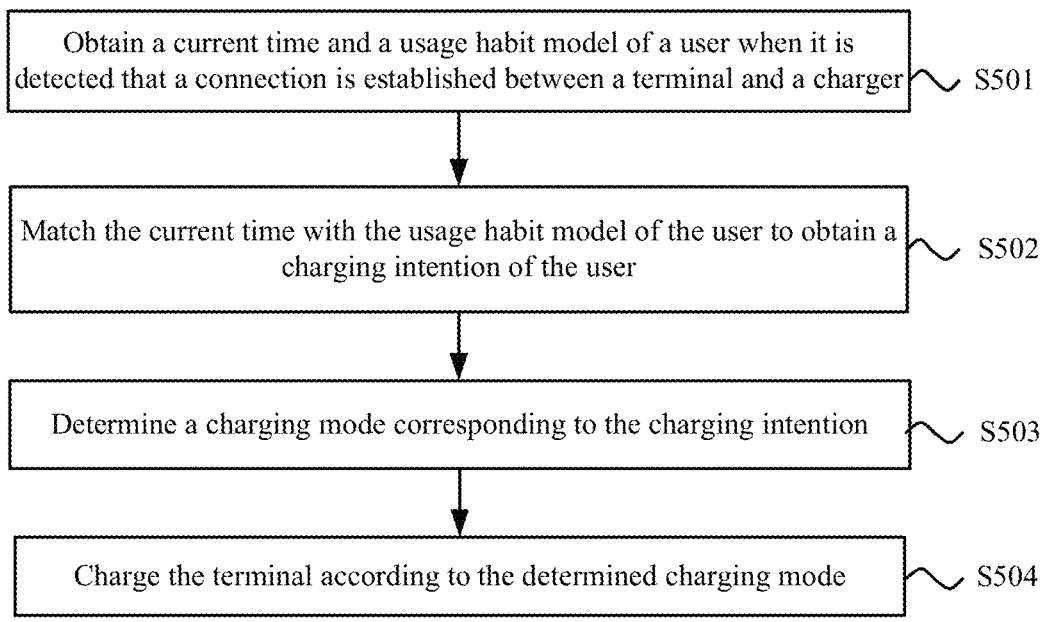
FIG. 6 is flowchart of a charging method according to an embodiment of the present disclosure.

As shown in FIG. 6, the present disclosure provides a charging method, and the charging method includes the following steps.

S501: Obtain a current time and a usage habit model of a user when it is detected that a connection is established between a terminal and a charger.

The method is performed by the terminal, and the terminal may be an electronic device such as a mobile phone, a tablet computer, or an intelligent wearable device.

It can be understood that, before obtaining a usage habit model of a user, the terminal trains, by using a preset machine learning algorithm, historical data that the user uses the terminal, to obtain the usage habit model of the user. The machine learning algorithm includes but is not limited to a classification algorithm, a clustering algorithm, a regression algorithm, an enhanced learning algorithm, a migration learning algorithm, and a deep learning algorithm.

The terminal obtains the historical data about the terminal from a database, a storage medium, or a cloud, then analyzes the historical data by using the preset machine learning algorithm to obtain an analysis result, and then performs generalization, convergence, and correction on the analysis result so as to obtain the usage habit model of the user. The historical data includes but is not limited to a time period for which the user uses the terminal, a location at which the user uses the terminal (for example, may be located by using a GPS), an activity type of the user corresponding to the time period and the location (for example, sleeping, working, entertainment, outdoor sports, or the like), an environmental status corresponding to the time period and the location (for example, a temperature, a humidity, a light intensity, and an altitude), a time period of peak power consumption, and an application program used at a frequency greater than a third preset threshold (for example, an application program that runs for at least 20 minutes each day or an application program that runs for at least three times each day).

S502: Match the current time with the usage habit model of the user to obtain a charging intention of the user.

Optionally, to more accurately understand the charging intention of the user, the following may be considered: obtaining a location of the terminal, and inputting the current time and the location of the terminal as parameters into the usage habit model of the user to determine the charging intention of the user.

Optionally, to more accurately understand the charging intention of the user, the following may be considered: obtaining a location of the terminal, and inputting the current time and the location of the terminal as parameters into the usage habit model of the user to determine the charging intention of the user.

Optionally, to more accurately understand the charging intention of the user, the following may be considered: obtaining information about an environment in which the terminal is located, and inputting the current time and the information about the environment in which the terminal is located as parameters into the usage habit model of the user to determine the charging intention of the user.

Optionally, to more accurately understand the charging intention of the user, the following may be considered: obtaining information about an environment in which the terminal is located and a location of the terminal, and inputting the current time, the location of the terminal, and the information about the environment in which the terminal is located as parameters into the usage habit model of the user to determine the charging intention of the user.

S503: Determine a charging mode corresponding to the charging intention.

Common modes include fast charging, slow charging, standard charging or a combination of fast charging and slow charging (for example, first fast charging and then slow charging or first slow charging and then fast charging).

S504: Charge the terminal according to the determined charging mode.

It should be noted that, before the charging the terminal according to the charging mode, the determined charging mode may also be displayed on a screen for confirmation by the user; and charging the terminal according to the charging mode when an instruction that the user confirms that charging is performed according to the charging mode is received. When a charging mode change instruction entered by the user is received, the user is prompted to select a new charging mode, the user-selected charging mode is received, the charging is performed according to the user-selected charging mode, and the usage habit pattern of the user is corrected according to the user-selected charging mode.

In addition, it should be noted that, there is also a possibility that the usage habit model of the user fails to be obtained. For example, the terminal does not yet obtain the usage habit model of the user by means of training, or a storage medium is damaged, and the terminal cannot obtain the usage habit model from the medium. In this case, there are several methods to determine a charging mode.

Optionally, when obtaining the usage habit model of the user fails, whether the current time is in a preset sleep time period is determined; and when the current time is within the preset sleep time period, to make the electricity quantity of the terminal reach a preset value, a required terminal charging time length is calculated according to the current time and the preset sleep time period; and the charging mode is determined according to the time length.

Optionally, when obtaining the usage habit model of the user fails, a remaining electricity quantity and a current location of the terminal are obtained. When the remaining electricity quantity is less than a first preset threshold and the current location does not belong to a preset location set, the charging mode is determined as a fast charging mode.

Optionally, when obtaining the usage habit model of the user fails, a remaining electricity quantity is obtained, and whether there is a running application program in the terminal is detected. When the remaining electricity quantity is less than a second preset threshold and there is a running application program in the terminal, the charging mode is determined as a fast charging mode.

It can be learnt from the foregoing that the present disclosure provides a charging method for a terminal. The terminal can automatically learn historical data by using a machine learning algorithm, to establish a habit model of a user, and may determine a current charging intention of the user according to a current time and the usage habit model of the user, so as to determine a charging mode according to the charging intention. By means of the technical solutions, a charging requirement of a user can be effectively identified, and on-demand charging can be implemented. This improves user experience while avoiding a battery life decrease caused by frequent fast charging.

A person of ordinary skill in the art may be aware that, in combination with the examples described in the embodiments disclosed in this specification, units and algorithm steps may be implemented by electronic hardware or a combination of computer software and electronic hardware.

Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging method, wherein the method comprises:
   training, by using a preset machine learning algorithm, historical data that a user uses a terminal to obtain a usage habit model of the user;
   obtaining a location of the terminal and a current time in response to detecting that a connection is established between the terminal and a charger;
   matching the location of the terminal and the current time with the usage habit model of the user to obtain a charging intention of the user;
   determining a charging mode corresponding to the charging intention of the user; and
   charging the terminal according to the charging mode.

2. The method according to claim 1, wherein the historical data that the user uses the terminal comprises historical location information of the terminal.

3. The method according to claim 2, wherein before training, by using the preset machine learning algorithm, the historical data that the user uses the terminal, the method further comprises:
   obtaining the historical data that the user uses the terminal within a preset time period; and
   wherein training, by using the preset machine learning algorithm, the historical data that the user uses the terminal comprises:
   analyzing the historical data by using the preset machine learning algorithm; and
   correcting an analysis result, and setting the corrected analysis result to the usage habit model of the user.

4. The method according to claim 1,
   wherein matching the location of the terminal and the current time with the usage habit model of the user to obtain the charging intention of the user comprises:
   determining the charging intention of the user according to the current time, the location of the terminal, and the usage habit model of the user.

5. The method according to claim 4, wherein before matching the location of the terminal and the current time with the usage habit model of the user to obtain the charging intention of the user, the method further comprises:
   obtaining information about an environment in which the terminal is located; and
   wherein matching the location of the terminal and the current time with the usage habit model of the user to obtain the charging intention of the user comprises:
   determining the charging intention of the user according to the current time, the location of the terminal, the information about the environment in which the terminal is located, and the usage habit model of the user.

6. The method according to claim 1, wherein after determining the charging mode corresponding to the charging intention of the user, the method further comprises:
   sending a charging mode confirmation request to the user, wherein the charging mode confirmation request is used to ask the user whether charging is performed according to the charging mode; and
   in response to receiving an instruction that the user confirms that charging is performed according to the charging mode, charging the terminal according to the charging mode.

7. The method according to claim 6, wherein the method further comprises:
   in response to receiving a charging mode change instruction entered by the user, prompting the user to select a new charging mode; and in response to receiving a user-selected charging mode:
  performing charging according to the user-selected charging mode; and
  correcting a usage habit pattern of the user according to the user-selected charging mode.

8. The method according to claim 1, wherein the method further comprises:
  when obtaining the usage habit model of the user fails, determining whether the current time is in a preset sleep time period;
  calculating a length of time available for charging according to the current time and the preset sleep time period when the current time is in the preset sleep time period; and
  determining the charging mode according to the length of time available for charging.

9. The method according to claim 1, wherein the method further comprises:
  when obtaining the usage habit model of the user fails, obtaining a remaining electricity quantity and a current location of the terminal; and
  when the remaining electricity quantity is less than a first preset threshold and the current location does not belong to a preset location set, determining that the charging mode is a fast charging mode.

10. The method according to claim 1, wherein the method further comprises:
  when obtaining the usage habit model of the user fails, obtaining a remaining electricity quantity of the terminal, and detecting whether there is a running application program in the terminal; and
  when the remaining electricity quantity is less than a second preset threshold and there is a running application program, determining that the charging mode is a fast charging mode.

11. The method according to claim 1, wherein the current time is input into the usage habit model of the user to obtain the charging intention of the user, and the preset machine learning algorithm include at least one of a classification algorithm, a clustering algorithm, a regression algorithm, an enhanced learning algorithm, a migration learning algorithm, or a deep learning algorithm.

12. A terminal, wherein the terminal comprises:
  at least one processor; and
  a non-transitory computer-readable storage medium coupled to the at least one processor and storing programming instructions for execution by the at least one processor, the programming instructions instruct the at least one processor to:
    train, by using a preset machine learning algorithm, historical data that a user uses the terminal to obtain a usage habit model of the user;
    obtain a location of the terminal and a current time in response to detecting that a connection is established between the terminal and a charger;
    match the location of the terminal and the current time with the usage habit model of the user to obtain a charging intention of the user;
    determine a charging mode corresponding to the charging intention of the user; and
    instruct a charger to charge the terminal according to the charging mode.

13. The terminal according to claim 12, wherein the historical data that the user uses the terminal comprises historical location information of the terminal.

14. The terminal according to claim 13, wherein the programming instructions instruct the at least one processor to:
  obtain the historical data that the user uses the terminal within a preset time period;
  analyze the historical data by using the preset machine learning algorithm to obtain an analysis result; and
  correct the analysis result, and set the corrected analysis result to the usage habit model of the user.

15. The terminal according to claim 12, wherein the programming instructions instruct the at least one processor to:
  determine the charging intention of the user according to the current time, the location of the terminal, and the usage habit model of the user.

16. The terminal according to claim 15, wherein the programming instructions instruct the at least one processor to:
  obtain information about an environment in which the terminal is located; and
  determine the charging intention of the user according to the current time, the location of the terminal, the information about the environment in which the terminal is located, and the usage habit model of the user.

17. The terminal according to claim 12, wherein the programming instructions instruct the at least one processor to:
  send a charging mode confirmation request to the user, wherein the charging mode confirmation request is used to ask the user whether charging is performed according to the charging mode; and
  in response to receiving an instruction that the user confirms that charging is performed according to the charging mode, charge the terminal according to the charging mode.

18. The terminal according to claim 17, wherein the programming instructions instruct the at least one processor to:
  when in response to receiving a charging mode change instruction entered by the user, prompt the user to select a new charging mode;
  in response to receiving a user-selected charging mode:
    instruct the charger to perform charging according to the user-selected charging mode; and
    correct a usage habit pattern of the user according to the user-selected charging mode.

19. The terminal according to claim 12, wherein the programming instructions instruct the at least one processor to:
  when obtaining the usage habit model of the user fails, determine whether the current time is in a preset sleep time period;
  calculate a length of time available for charging according to the current time and the preset sleep time period when the current time is in the preset sleep time period; and
  determine the charging mode according to the length of time available for charging.

20. The terminal according to claim 12, wherein the programming instructions instruct the at least one processor to:
  obtain a remaining electricity quantity and a current location of the terminal when obtaining the usage habit model of the user fails; and
  when the remaining electricity quantity is less than a first preset threshold and the current location does not belong to a preset location set, determine that the charging mode is a fast charging mode.

21. The terminal according to claim 12, wherein the programming instructions instruct the at least one processor to:
- obtain a remaining electricity quantity of the terminal when obtaining the usage habit model of the user fails;
- when obtaining the usage habit model of the user fails, detect whether there is a running application program in the terminal; and
- when the remaining electricity quantity is less than a second preset threshold and there is a running application program, determine that the charging mode is a fast charging mode.

* * * * *